(12) United States Patent
Zhang et al.

(10) Patent No.: US 11,589,327 B2
(45) Date of Patent: Feb. 21, 2023

(54) MANAGING UPLINK TIMING ADVANCE CONFIGURATION

(71) Applicant: QUALCOMM Incorporated, San Diego, CA (US)

(72) Inventors: Xiaoxia Zhang, San Diego, CA (US); Yitao Chen, San Diego, CA (US); Jing Sun, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/377,270

(22) Filed: Jul. 15, 2021

(65) Prior Publication Data

US 2023/0020898 A1    Jan. 19, 2023

(51) Int. Cl.
*H04L 5/00*    (2006.01)
*H04W 56/00*    (2009.01)
*H04W 16/28*    (2009.01)
*H04W 74/08*    (2009.01)

(52) U.S. Cl.
CPC ......... *H04W 56/005* (2013.01); *H04W 16/28* (2013.01); *H04W 74/0841* (2013.01)

(58) Field of Classification Search
CPC .............. H04W 56/005; H04W 16/28; H04W 74/0841
See application file for complete search history.

(56) References Cited

U.S. PATENT DOCUMENTS

2007/0149206 A1* 6/2007 Wang ................ H04W 36/0085
                                                     455/450
2019/0268124 A1* 8/2019 Luo ........................ H04W 76/27
2020/0350977 A1   11/2020 Ryu et al.

OTHER PUBLICATIONS

International Search Report and Written Opinion—PCT/US2022/032469—ISA/EPO—dated Oct. 4, 2022.

* cited by examiner

*Primary Examiner* — Jamal Javaid
(74) *Attorney, Agent, or Firm* — The Marbury Law Group, PLLC

(57) ABSTRACT

Various embodiments include methods for managing uplink timing advance configuration of wireless devices by a base station. A wireless device may send an initial access signal to a base station, receive from the base station an initial timing advance value responsive to the initial access signal, and send to the base station a next signal comprising a Physical Random Access Channel (PRACH) waveform via uplink (UL) receive (Rx) points over two or more beams. The base station may receive the next signal including the PRACH waveform via the two or more UL Rx points, select a refined timing advance value based on the signal, and send the refined timing advance value to the wireless device. The wireless device may receive the refined timing advance value and send a further signal to the base station via one of the UL Rx points using the refined timing advance.

22 Claims, 10 Drawing Sheets

MANAGING UPLINK TIMING ADVANCE CONFIGURATION

BACKGROUND

Standards for Fifth Generation (5G) New Radio (NR) address using millimeter wave ("mmWave") communications to expand communication bandwidth. To use millimeter wave frequency bands to provide wireless communication services to wireless devices, a large number of small cells that communicate with a larger base station (such as a macro cell or node, or a central cell or node) via a backhaul communication link may be deployed within a given area. Deploying a large number of small cells within a given area is sometimes termed a "dense deployment." In such communication system deployments, the base station has sufficient transmit power to transmit signals to wireless devices within an area, but wireless devices may have relatively limited transmit power and stored energy in their batteries. So, some dense deployments may include uplink receive (UL Rx) points to receive signals from wireless devices and convey the received signals to a base station via a backhaul communication link. However, the asymmetrical nature of uplink and downlink signals in such dense deployments may create challenges in aligning the timing of the uplink and downlink signals.

SUMMARY

Various aspects include methods that may be performed by a processor of a wireless device for managing uplink timing advance configuration. Various aspects include sending an initial access signal to a base station, receiving from the base station an initial timing advance value responsive to the initial access signal, sending to the base station a next signal including a Physical Random Access Channel (PRACH) waveform via two or more uplink (UL) receive (Rx) points over two or more beams, receiving from the base station a refined timing advance value, and sending a further signal to the base station via one of the two or more UL Rx points using the refined timing advance value.

In some aspects, receiving from the base station an initial timing advance value responsive to the initial access signal may include receiving from the base station a dedicated Random Access Channel (RACH) occasion, a PRACH format, and a PRACH sequence for the next signal, and sending to the base station the next signal may include sending the next signal using the dedicated RACH occasion, PRACH format, and PRACH sequence. In some aspects, receiving from the base station an initial timing advance value responsive to the initial access signal may include receiving from the base station a number of repetitions for the next signal, and sending to the base station the next signal may include sending the next signal using the number of repetitions.

In some aspects, receiving from the base station an initial timing advance value responsive to the initial access signal may include receiving from the base station a number of beam sweeps for the next signal, and sending to the base station the next signal may include sending the next signal using the number of beam sweeps. In some aspects, receiving from the base station an initial timing advance value responsive to the initial access signal may include receiving from the base station a plurality of PRACH formats for the next signal, and sending to the base station the next signal may include sending the plurality of PRACH formats. In some aspects, the refined timing advance value may correspond to one of the two or more UL Rx points.

Various aspects include methods that may be performed by a processor of a base station for managing uplink timing advance configuration. Various aspects may include receiving an initial access signal from a wireless device, sending to the wireless device an initial timing advance value based on the initial access signal, receiving from the wireless device a next signal including a Physical Random Access Channel (PRACH) waveform via two or more uplink (UL) receive (Rx) points over two or more beams, selecting a refined timing advance value based on the next signal received via the two or more UL Rx points, and sending the refined timing advance value to the wireless device.

In some aspects, sending to the wireless device an initial timing advance value based on the initial access signal may include sending to the wireless device a dedicated Random Access Channel (RACH) occasion, a PRACH format, and a PRACH sequence for the next signal from the wireless device. In some aspects, sending to the wireless device an initial timing advance value based on the initial access signal may include sending to the wireless device a number of repetitions for the next signal from the wireless device. In some aspects, sending to the wireless device an initial timing advance value based on the initial access signal may include sending to the wireless device a number of beam sweeps for the next signal from the wireless device.

In some aspects, sending to the wireless device an initial timing advance value based on the initial access signal may include sending to the wireless device a plurality of PRACH formats for the next signal from the wireless device. In some aspects, the refined timing advance value corresponds to a UL Rx point from among the two or more UL Rx points. In some aspects, sending the refined timing advance value to the wireless device may include sending to the wireless device one or more of a Physical Downlink Control Channel (PDCCH) signal and a Physical Downlink Shared Channel (PDSCH) signal.

Further aspects may include a base station having a processor configured to perform one or more operations of any of the methods described above. Further aspects may include a non-transitory processor-readable storage medium having stored thereon processor-executable instructions configured to cause a processor of a base station to perform operations of the methods summarized above. Further aspects include a base station having means for performing functions of the methods summarized above. Further aspects include a system on chip for use in a base station that includes a processor configured to perform one or more operations of the methods summarized above. Further aspects include a system in a package that includes two systems on chip for use in a base station that includes a processor configured to perform one or more operations of any of the methods described above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
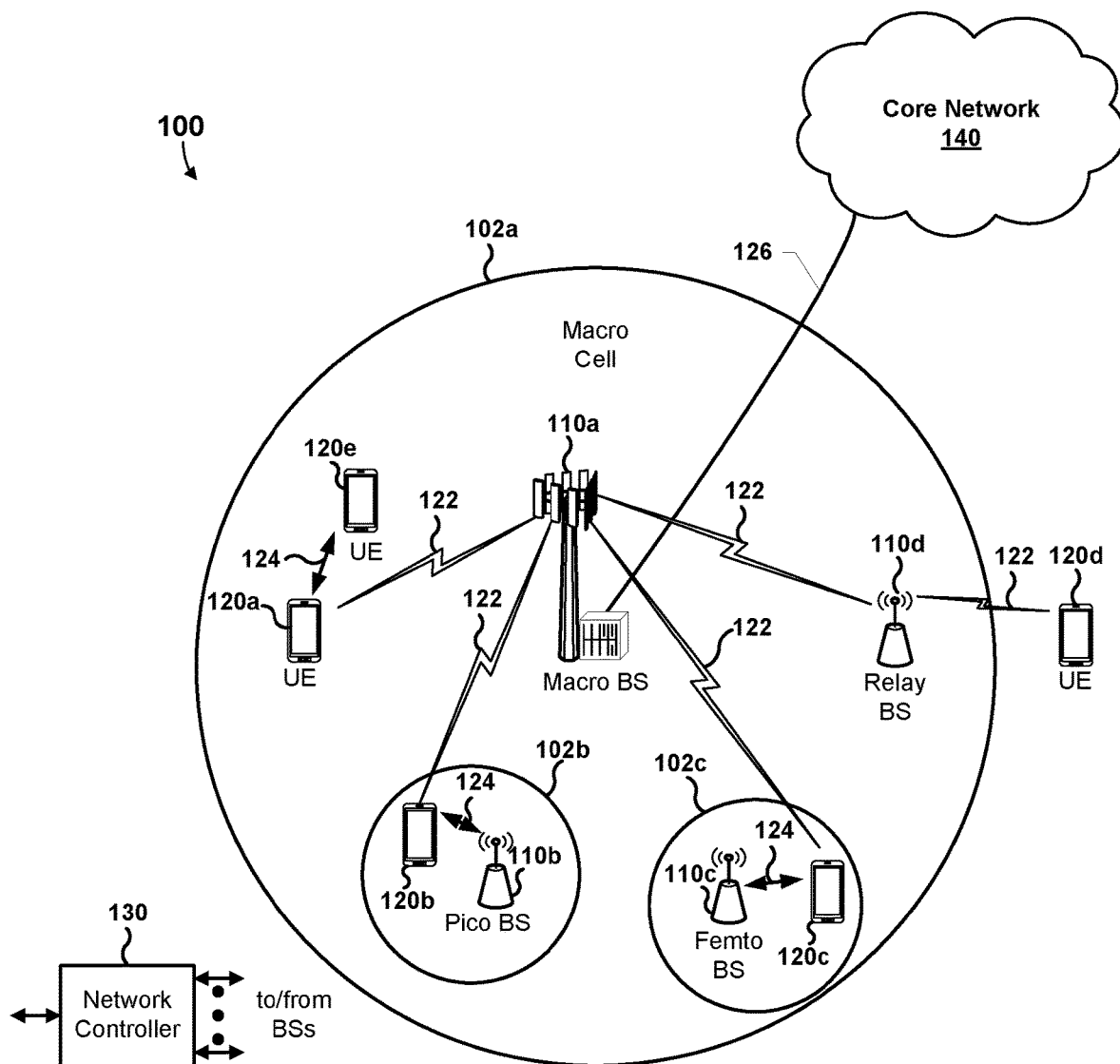
FIG. 1 is a system block diagram illustrating an example communications system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and wireless devices and base stations configured to implement the methods, of managing uplink timing advance configurations that are particularly useful in dense deployment wireless communication settings. In a dense deployment using UL Rx points (sometimes referred to as an "uplink dense deployment"), the base station transmits a downlink signal to the wireless device, and the wireless device transmits an uplink signal that is received by the UL Rx point. A dense deployment environment may include a plurality of UL Rx points that are spatially separated and deployed to improve UL signal reception from wireless devices. In such network deployments, the wireless device receive no information indicating that its uplink signals are received by (or received better by) an UL Rx point rather than by the base station supporting the cell on which the wireless device is camped. In such an environment, the uplink and the downlink are asymmetrical because the wireless device receives downlink transmissions from the base station but uplink transmission from the wireless device are received by an UL Rx point (instead of the base station). Because the uplink and the downlink are asymmetrical, correctly aligning the timing of uplink and downlink signals can be challenging.

As used herein, "beam" refers to a signal formed at a transmitting device through the use of a beamforming or beam steering technique applied via a combination of physical equipment and signal processing variously referred to as a beamforming function, a mapping function, or a spatial filter. Beam reception by a receiving device may involve configuring physical equipment and signal processing of the receiving device to receive signals transmitted in a beam by the transmitting device. In some situations, beam reception by a receiving device also may involve configuring physical equipment and signal processing of the receiving device via a beamforming function, a mapping function, or a spatial filter so as to preferentially receive signals (e.g., with enhanced gain) from a particular direction such as in a direction aligned with a transmitting device.

The term "beamforming" is used herein to refer to antenna array design and signal processing techniques used for directional signal communications and/or to achieve spatial selectivity of radio frequency (RF) signal reception. Beamforming on the transmitter end of communications may be accomplished by selective delaying (known as "phase shifting") of signals coupled to different elements in an antenna array so that RF signals emitted by the antenna array at a particular angle relative to the antenna array are enhanced through constructive interference while RF signals emitted by the antenna array at other angles (relative to the antenna) exhibit lower signal strength due to destructive interference. Beamforming on the receiver end of communications may be accomplished by processing signals received by elements in an antenna array through phase shifting circuits so that RF signals received at particular angles relative to the receiving antenna array are enhanced through constructive interference while RF signals received at other angles relative to the wireless device are reduced in perceived signal strength through destructive interference. Using beamforming techniques, RF signals may be transmitted (e.g., by a base station or wireless device) in one or more directional "beams" within the millimeter band for ultra-wideband communications. Each of such directional beams may be controlled by the transmitter using beamforming techniques to sweep in one or two dimensions (i.e., azimuth and elevation directions). Beamforming in both transmitters and receivers may be accomplished using analog (e.g., phase shifter) circuits and digital processing techniques. To encompass both techniques, reference is sometimes made herein to "analog/RF beamforming" techniques and equipment.

The term "spatial filter" is used herein to refer to hardware and/or signal processing used by a device (such as a wireless device or a base station) to perform beamforming for signal reception (also referred to as spatial filtering) of a wireless transmission.

The term "wireless device" is used herein to refer to any one or all of user equipment (UE), cellular telephones, smartphones, portable computing devices, wireless router devices, wireless appliances, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

As noted above, there are challenges in aligning the timing of the uplink and downlink signals in dense deployments of UL Rx points supporting one or a few base stations while avoiding an increase in messaging overhead in the communication system. This is because in a dense deployment, uplink signals are received by an UL Rx point while a wireless device receives downlink signals from a base station. Conventional solutions to these challenges may be inefficient. For example, a wireless device may be configured to transmit an initial access signal repetitively using different uplink spatial filters, and UL Rx points may be configured to perform beam sweeping using different spatial filters. The performance of beam sweeping by the UL Rx points may provide sufficient information for a base station to determine an appropriate uplink timing for the wireless device. However, the repetitive transmission by the wireless device of the initial access signal causes a substantial increase in signaling overhead. Further, the base station must allocate sufficient uplink resources to enable the wireless device to repetitively transmit the initial access signal.

Various embodiments enable wireless devices and base stations to perform methods for managing uplink timing advance configuration in dense deployments of UL Rx points supporting one or a few base stations. In various embodiments, a wireless device may send an initial access signal to a base station that includes a signal that is part of an initial access process or procedure, such as a Random Access Channel (RACH) procedure. In some embodiments, the initial access signal may include a Msg1 signal of a 6-step RACH procedure. In various embodiments, the wireless device may send the initial access signal using parameters (e.g., signal transmit power) to reach a base station and not just nearby UL Rx points.

In some embodiments, the base station may receive the initial access signal and, in response, send to the wireless device an initial timing advance value based on the initial access signal. In some embodiments, the base station may send the initial timing advance value in a Msg2a signal of a 6-step RACH procedure. In some embodiments, the base station may determine the initial timing advance value based on the Msg1 signal received by the base station. In some situations, the initial timing advance indicated by the base station may be zero, or the base station may not include any initial timing advance in the Msg 2a signal. For example, the base station may determine that an initial timing advance value based on the Msg1 signal may not correspond sufficiently to an appropriate UL Rx point.

The base station may have access to information indicating a location of one or more UL Rx points. In some embodiments, the base station may perform a measurement (e.g., of signal strength) of the Msg1 signal. The base station may determine or estimate a distance of the wireless device from the base station based on the measurement of the Msg1 signal. Based at least in part on the determined or estimated distance of the wireless device from the base station, and the location of the one or more UL Rx points, the base station may determine the initial timing advance value.

In some embodiments, the base station may send information to the wireless device to configure RACH occasions, one or more PRACH formats, and one or more PRACH sequences for a next signal to be transmitted by the wireless device. In some embodiments, the base station may indicate a number of RACH occasions to be used for repetitions per beam of the next signal to be transmitted by the wireless device. In some embodiments, the base station may indicate a different PRACH sequence for each repetition per beam. In some embodiments, the base station may send information to the wireless device to configure a PRACH waveform for the next signal to be transmitted by the wireless device. In some embodiments, the base station may send information to the wireless device to configure a cyclic prefix and/or a guard time for the next signal to be transmitted by the wireless device. In some embodiments, the cyclic prefix and/or guard time for the next signal may be different from a cyclic prefix or guard time used by the wireless device to transmit the initial access signal. In some embodiments, the base station may send information to the wireless device to configure transmit power control and/or channel access parameters for the next signal to be transmitted by the wireless device.

In some embodiments, the base station may send to the wireless device information indicating a dedicated Random Access Channel (RACH) occasion, a PRACH format, and a PRACH sequence for the next signal from the wireless device. In some embodiments, the base station may send information indicating a number of repetitions for the wireless device to use or perform in a next signal from the wireless device. In some embodiments, the base station may send information indicating a number of beam sweeps for the wireless device to use or perform in the next signal from the wireless device. In some embodiments, the base station may send information indicating a plurality of PRACH formats for the wireless device to use in the next signal from the wireless device. In some embodiments, the initial timing advance may be zero.

In some embodiments, the wireless device may send to the base station a next signal that includes a PRACH waveform via two or more UL Rx points over two or more beams. In some embodiments, the wireless device may send the next signal in a Msg3a signal of a 6-step RACH procedure. In some embodiments, the wireless device may send the next signal using the PRACH waveform indicated by the base station. In some embodiments, the wireless device may send the next signal using the PRACH waveform instead of or in place of a demodulation reference signal (DM RS). In some embodiments, the wireless device may send the next signal using the dedicated RACH occasion, PRACH format(s), and PRACH sequence(s) indicated by the base station. In this manner, the wireless device may send the next signal using the indicated PRACH waveform with repetition and beam sweeping.

In some embodiments, the base station may send to the wireless device a refined timing advance value. In some embodiments, the base station may determine the refined timing advance value based on the next signal sent by the wireless device via the two or more UL Rx points over the two or more beams. In some embodiments, the base station may send the refined timing advance value in a Msg2b signal of a 6-step RACH procedure. In some embodiments, the base station may send information indicating uplink grant parameters for the wireless device to use in sending a further signal. In some embodiments, the base station may address the refined timing advance value specifically to the wireless device, for example, using a temporary cell radio network temporary identifier (TC-RNTI). In some embodiments, the refined timing advance value may correspond to a UL Rx point from among the two or more UL Rx points. In this manner, the refined timing advance value may enable the alignment of the timing of downlink signals from the base station to the wireless device and uplink signals from the wireless device that are received by the UL Rx point.

In some embodiments, if the base station determines the initial timing advance to be zero, the base station may determine the refined timing advance value for the full cell size or range of coverage for the UL Rx point to which the refined timing advance value corresponds. In some embodiments, if the base station determines the initial timing advance to be a non-zero timing advance, the base station may balance the refined timing advance value with respect to the initial timing advance value. In some situations, the base station may reduce the refined timing advance value based on the value or amount of the initial timing advance.

In some embodiments, the base station may send to the wireless device a physical downlink control channel (PDCCH) signal and a physical downlink shared channel (PDSCH) signal. In such embodiments, the PDSCH signal may include the refined timing advance value in a payload. In such embodiments, the PDCCH signal may include uplink grant parameters for a further signal to be transmitted by the wireless device. In some embodiments, the base station may send to the wireless device a PDCCH signal, such as downlink control information (DCI), that includes uplink grant parameters for the wireless device and the refined timing advance value.

In some embodiments, if the base station has sent an initial timing value to the wireless device, the base station may send to the wireless device a 6 bit timing advance command (e.g., as part of the Msg2b signal) to indicate the refined timing advance value. In some embodiments, the base station may include the 6 bit timing advance command in a medium access command control element (MAC CE). In some embodiments, the base station may include the 6 bit timing advance command in an uplink grant address to the TC-RNTI. In some embodiments, the base station may reduce the 6 bit timing advance command to 5 bits, for example, with a smaller timing advance range, or with reduced timing advance granularity. In such embodiments, the base station may include the 5 bit timing advance command in bits for a New Data Indicator (NDI, 1 bit) and hybrid automatic repeat request (HARQ, 4 bits).

In some embodiments, if the base station has not sent an initial timing value to the wireless device (e.g., the initial timing value was zero), the base station may send to the wireless device a 12 bit timing advance command (e.g., as part of the Msg2b signal) to indicate the refined timing advance value. The 6 bit timing advance command or the 12 bit timing advance command may indicate an index value corresponding to a timing advance value.

FIG. 1 illustrates an example of a communications system 100 suitable for implementing various embodiments. The communications system 100 may be a 5G NR network, or any other suitable network such as an LTE network.

The communications system 100 may include a heterogeneous network architecture that includes a core network 140 and a variety of mobile devices (illustrated as wireless device 120a-120e in FIG. 1). The communications system 100 also may include a number of base stations (illustrated as the BS 110a, the BS 110b, the BS 110c, and the BS 110d) and other network entities. In some implementations, one or more of the base stations (such as 110b, 110c) may be configured to function as an uplink receive (UL Rx) point.

A base station is an entity that communicates with wireless devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. The term "cell" may refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network.

The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a mobile device) and send a transmission of the data to a downstream station (for example, a wireless device or a base station). A relay station also may be a wireless device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

Wired communication links may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (such as LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, various implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. The scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. In some examples, a wireless device may function as a scheduling entity, scheduling resources for one or more subordinate entities (for example, one or more other mobile devices). In this example, the wireless device is functioning as a scheduling entity, and other mobile devices utilize resources scheduled by the wireless device for wireless communication. A wireless device may function as a scheduling entity in a peer-to-peer (P2P) network, in a mesh network, or another type of network. In a mesh network example, mobile devices may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
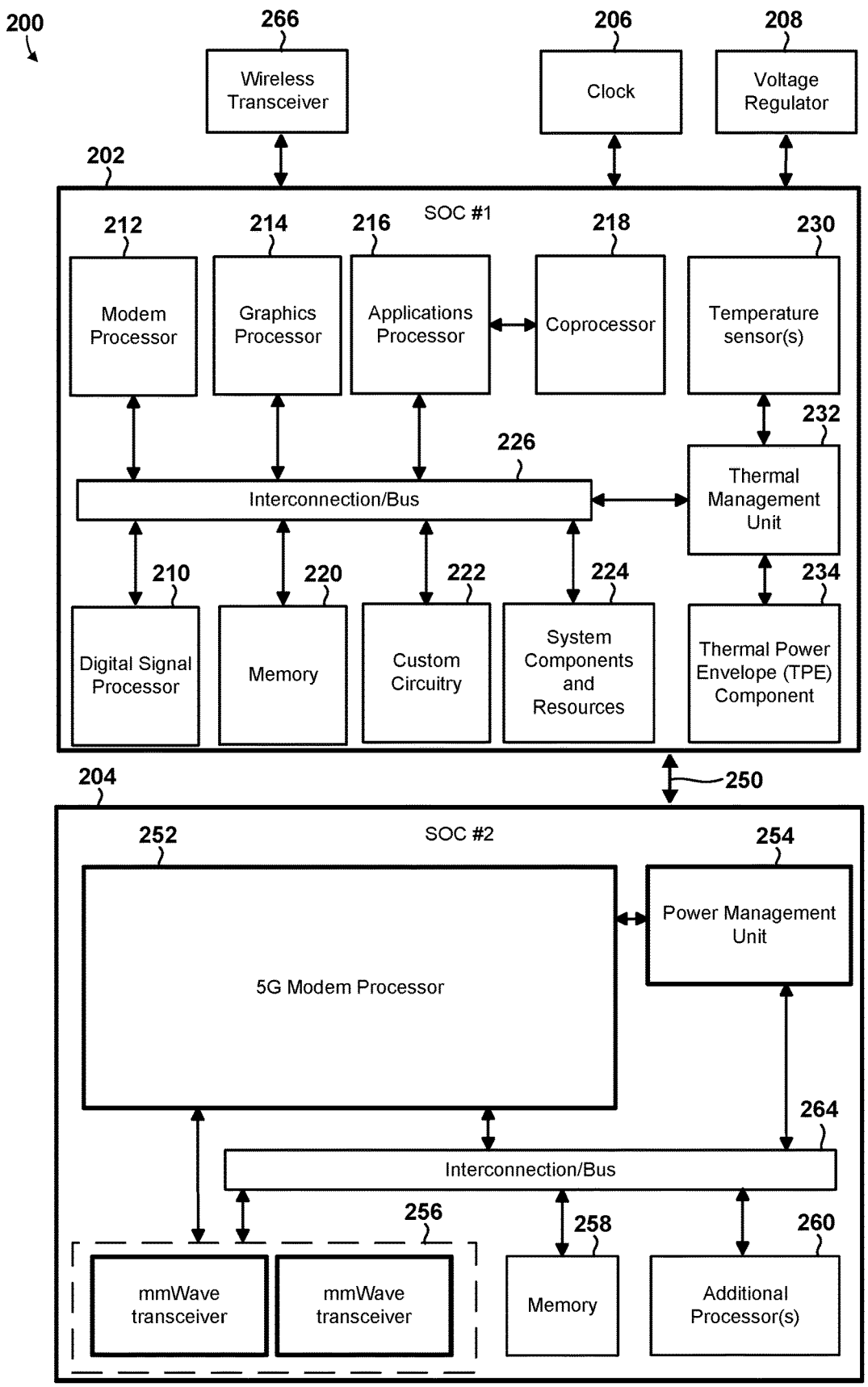
FIG. 2 is a component block diagram illustrating an example computing system suitable for implementing various embodiments.

FIG. 2 is a component block diagram illustrating an example computing system 200 suitable for implementing various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some implementations) includes two SOCs 202, 204 coupled to a clock 206, and a voltage regulator 208, and a wireless transceiver 266 configured to send and receive wireless communications via an antenna (not shown) to or from wireless devices, such as a base station 110a. In some implementations, the first SOC 202 may operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 in an apparatus (such as a processing system) may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.). In some implementations, any or all of the processors 210, 212, 214, 216, 218, 252, 260 may be a component of a processing system. A processing system may generally refer to a system or series of machines or components that receives inputs and processes the inputs to produce a set of outputs (which may be passed to other systems or components of, for example, the first SOC 202 or the second SOC 250). For example, a processing system of the first SOC 202 or the second SOC 250 may refer to a system including the various other components or subcomponents of the first SOC 202 or the second SOC 250.

The processing system of the first SOC 202 or the second SOC 250 may interface with other components of the first SOC 202 or the second SOC 250, and may process information received from other components (such as inputs or signals), output information to other components, etc. For example, a chip or modem of the first SOC 202 or the second SOC 250 may include a processing system, a first interface to output information, and a second interface to receive information. In some cases, the first interface may refer to an interface between the processing system of the chip or modem and a transmitter, such that the first SOC 202 or the second SOC 250 may transmit information output from the chip or modem. In some cases, the second interface may refer to an interface between the processing system of the chip or modem and a receiver, such that the first SOC 202 or the second SOC 250 may receive information or signal inputs, and the information may be passed to the processing system. A person having ordinary skill in the art will readily recognize that the first interface also may receive information or signal inputs, and the second interface also may transmit information.

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, various implementations may be implemented in a wide variety of processing systems, which may include a single processor, multiple processors, multicore processors, or any combination thereof.

Figure 3:
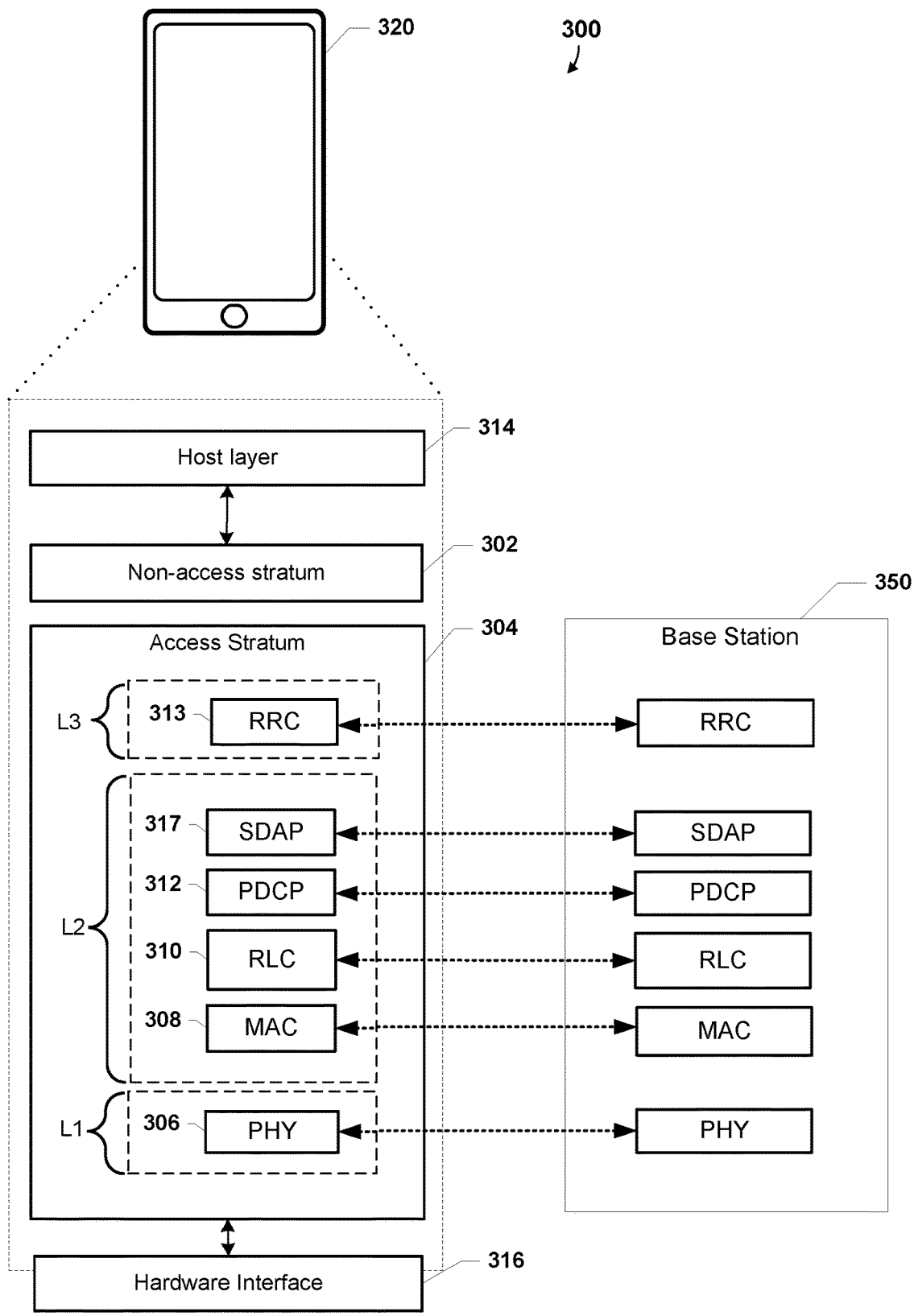
FIG. 3 is a component block diagram illustrating an example of a software architecture including a radio protocol stack for the user and control planes in wireless communications suitable for implementing various embodiments.

FIG. 3 is a component block diagram illustrating an example of a software architecture 300 including a radio protocol stack for the user and control planes in wireless communications. The software architecture 300 including a radio protocol stack for the user and control planes in wireless communications between a base station 350 (such as the base station 110*a*) and a wireless device 320 (such as the wireless device 120*a*-120*e*, 200). With reference to FIGS. 1-3, the wireless device 320 may implement the software architecture 300 to communicate with the base station 350 of a communication system (such as the communications system 100). In various implementations, layers in software architecture 300 may form logical connections with corresponding layers in software of the base station 350. The software architecture 300 may be distributed among one or more processing systems (such as the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (such as two protocol stacks associated with two SIMs, respectively, in a dual-SIM wireless communication device). While described below with reference to specific 5G NR communication layers, the software architecture 300 may support any of variety of standards and protocols for wireless communications, or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface via a wireless transceiver (such as the wireless transceiver 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various implementations, Layer 2 may include a media access control (MAC) sublayer 308, a radio link control (RLC) sublayer 310, and a packet data convergence protocol (PDCP) 312 sublayer, and a Service Data Adaptation Protocol (SDAP) 317 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various implementations, the RRC sublayer 313 may provide functions INCLUDING broadcasting system information, paging, and establishing and releasing an RRC signaling connection between the wireless device 320 and the base station 350.

In some implementations, the SDAP sublayer 317 may provide mapping between Quality of Service (QoS) flows and data radio bearers (DRBs). In the downlink, at the base station 350, the SDAP sublayer 317 may provide mapping for DL QoS flows to DRBs. In the uplink, at the wireless device 120, the SDAP sublayer 317 may deliver DL received QoS flows to upper layers. In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In some other implementations, the software architecture 300 may include one or more higher logical layer (such as transport, session, presentation, application, etc.) that provide host layer functions. For example, in some implementations, the software architecture 300 may include a network layer (such as Internet Protocol (IP) layer) in which a logical connection terminates at an access and mobility factor (AMF) or a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4A:
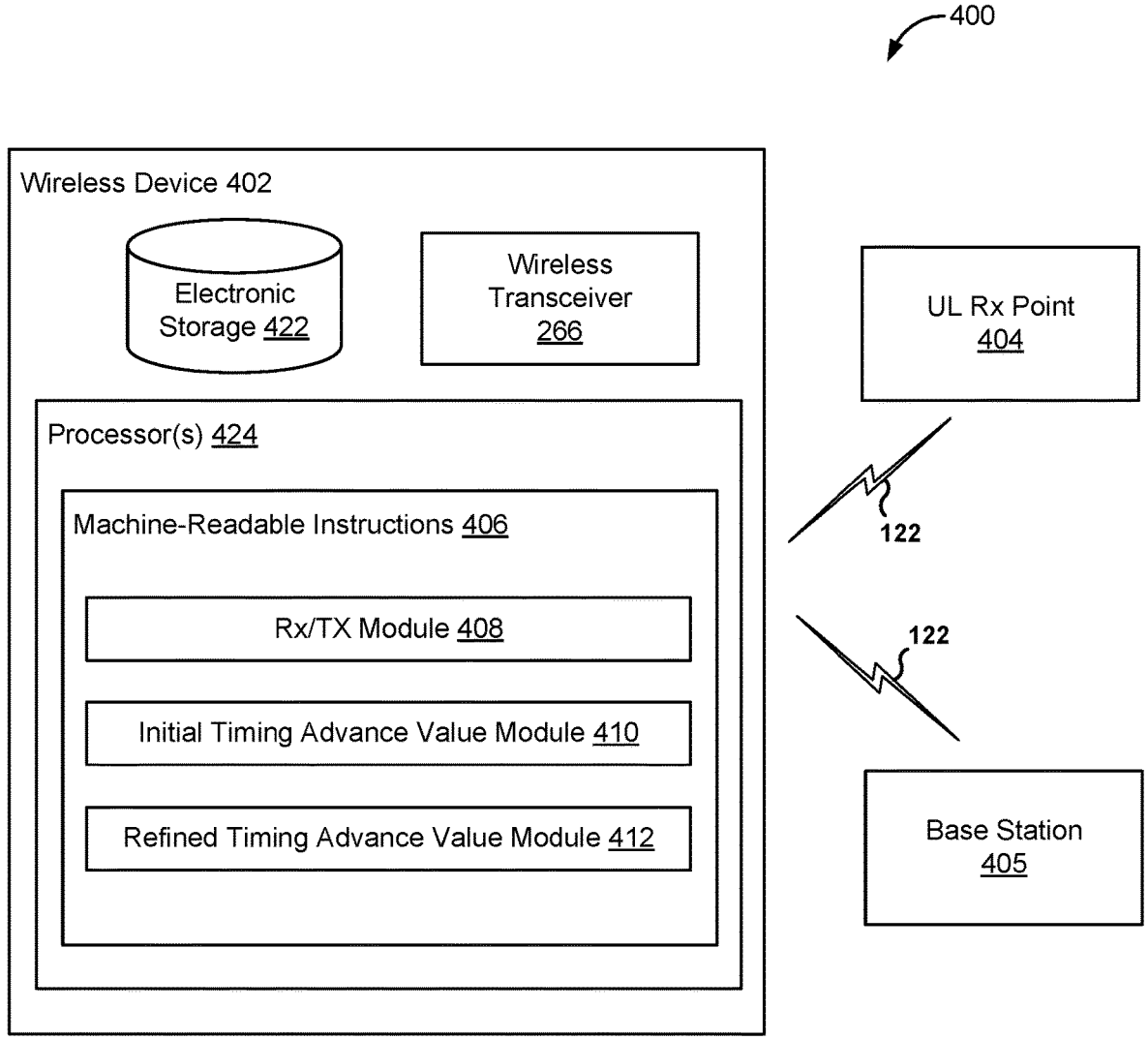
FIGS. 4A and 4B are component block diagrams illustrating an example system configured to manage uplink timing advance configuration.
Figure 4B:
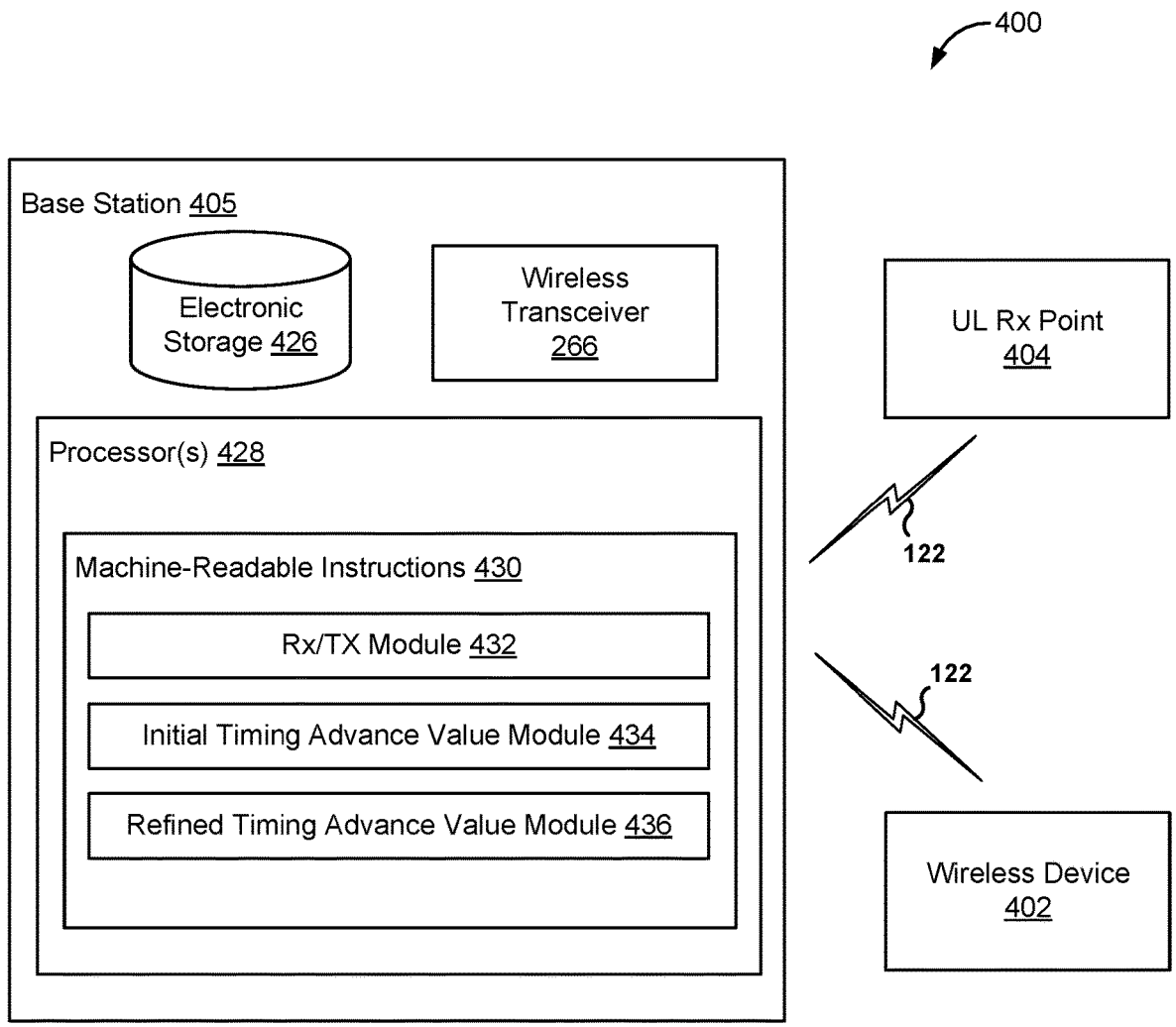

FIGS. 4A and 4B show component block diagrams of an example system 400 configured to manage uplink spatial filter configuration. With reference to FIGS. 1-4B, the system 400 may include a wireless device 402 (such as 120a-120e, 200, 320), an UL Rx point 404 (such as 110b, 110c), and a base station 405 (such as 110a).

Referring to FIG. 4A, a wireless device 402 may include one or more processors 424 that may be configured by machine-readable instructions 406. Machine-readable instructions 406 may include one or more instruction modules. The instruction modules may include computer program modules. The instruction modules may include one or more of a receiver/transmitter (Rx/Tx) module 408, an initial timing advance value module 410, a refined timing advance module 412, and other instruction modules.

The Rx/Tx module 408 may be configured to send signals to the UL Rx point 404 and to receive signals from the base station 405. The Rx/Tx module 408 may be configured to send an initial access signal to the base station. The Rx/Tx module 408 may be configured to receive from the base station an initial timing advance value responsive to the initial access signal. The Rx/Tx module 408 may be configured to send to the base station a next signal including a PRACH waveform via two or more UL Rx points over two or more beams. The Rx/Tx module 408 may be configured to receive from the base station a refined timing advance value. The Rx/Tx module 408 may be configured to send a further signal to the base station via one of the two or more UL Rx points using the refined timing advance.

The initial timing advance value module 410 may be configured to process an initial timing advance value received from the base station.

The refined timing advance value module 412 may be configured to process a refined timing advance value received from the base station.

Referring to FIG. 4B, a base station 405 may include one or more processors 428 that may be configured by machine-readable instructions 430. Machine-readable instructions 406 may include one or more instruction modules. The instruction modules may include computer program modules. The instruction modules may include one or more of a receiver/transmitter (Rx/Tx) module 432, an initial timing advance value module 434, a refined timing advance value module 436, and other instruction modules.

The Rx/Tx module 408 may be configured to send signals to the wireless device 402 and to receive signals from the UL Rx point 404. The Rx/Tx module 408 may be configured to receive an initial access signal from a wireless device. The Rx/Tx module 408 may be configured to send to the wireless device an initial timing advance value based on the initial access signal. The Rx/Tx module 408 may be configured to receive from the wireless device a next signal including a PRACH waveform via two or more UL Rx points 404 over two or more beams. The Rx/Tx module 408 may be configured to send a refined timing advance value to the wireless device.

The initial timing advance value module 434 may be configured to select an initial timing advance value for use by the wireless device.

The refined timing advance value module 436 may be configured to select a refined timing advance value based on the next signal received via the two or more UL Rx points.

The wireless device 402 and the base station 405 may include an electronic storage 422, 426, one or more processors 424, 428, or other components. The wireless device 402 and the base station 405 may include communication lines, or ports to enable the exchange of information with a network or other computing platforms. The illustrations of the wireless device 402 and the base station 405 are not intended to be limiting, and the wireless device 402 and the base station 405 may include a plurality of hardware, software, or firmware components operating together to provide the functionality attributed herein to the wireless device 402 and the base station 405.

The electronic storage 422, 426 may include non-transitory storage media that electronically stores information. The storage media of the electronic storage 422, 426 may include one or both of system storage that is provided integrally (i.e., substantially non-removable) with the wireless device 402 or the base station 405 or removable storage that is removably connectable to wireless device 402 or the base station 405 via, for example, a port (such as a universal serial bus (USB) port, a firewire port, etc.) or a drive (such as a disk drive, etc.). The electronic storage 422, 426 may include one or more of optically readable storage media (such as optical disks, etc.), magnetically readable storage media (such as magnetic tape, magnetic hard drive, floppy drive, etc.), electrical charge-based storage media (such as EEPROM, RAM, etc.), solid-state storage media (such as a flash drive, etc.), or other electronically readable storage media. The electronic storage 422, 426 may include one or more virtual storage resources (such as cloud storage, a virtual private network, or other virtual storage resources). The electronic storage 422, 426 may store software algorithms, information determined by processor(s) 424, 428, information received from the wireless device 402, information received from the UL Rx point 404, information received from the base station 405, or other information that enables each device to function as described herein.

Processor(s) 424, 428 may be configured to provide information processing capabilities in the wireless device 402. As such, processor(s) 424, 428 may include one or more of a digital processor, an analog processor, a digital circuit designed to process information, an analog circuit designed to process information, a state machine, or other mechanisms for electronically processing information. Although processor(s) 424, 428 are shown as a single entity, this is for illustrative purposes only. In some implementations, processor(s) 424, 428 may include a plurality of processing units. These processing units may be physically located within the same device, or processor(s) 424, 428 may represent processing functionality of a plurality of devices operating in coordination. Processor(s) 424, 428 may be configured to execute modules 408-412 and 432-436, or other modules. Processor(s) 424, 428 may be configured to execute modules 408-412 and 432-436, or other modules by software; hardware; firmware; some combination of software, hardware, or firmware; or other mechanisms for configuring processing capabilities on the processor(s) 408-412 and 432-436. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-412 and 432-436 described below is for illustrative purposes, and is not intended to be limiting, as any of the modules 408-412 and 432-436 may provide more or less functionality than is described. For example, one or more of modules 408-412 and 432-436 may be eliminated, and some or all of its functionality may be provided by other ones of the modules 408-412 and 432-436. As another example, processor(s) 408-412 and 432-436 may be configured to execute one or more additional modules that may perform some or all of the functionality attributed below to one of the modules 408-412 and 432-436.

Figure 5:
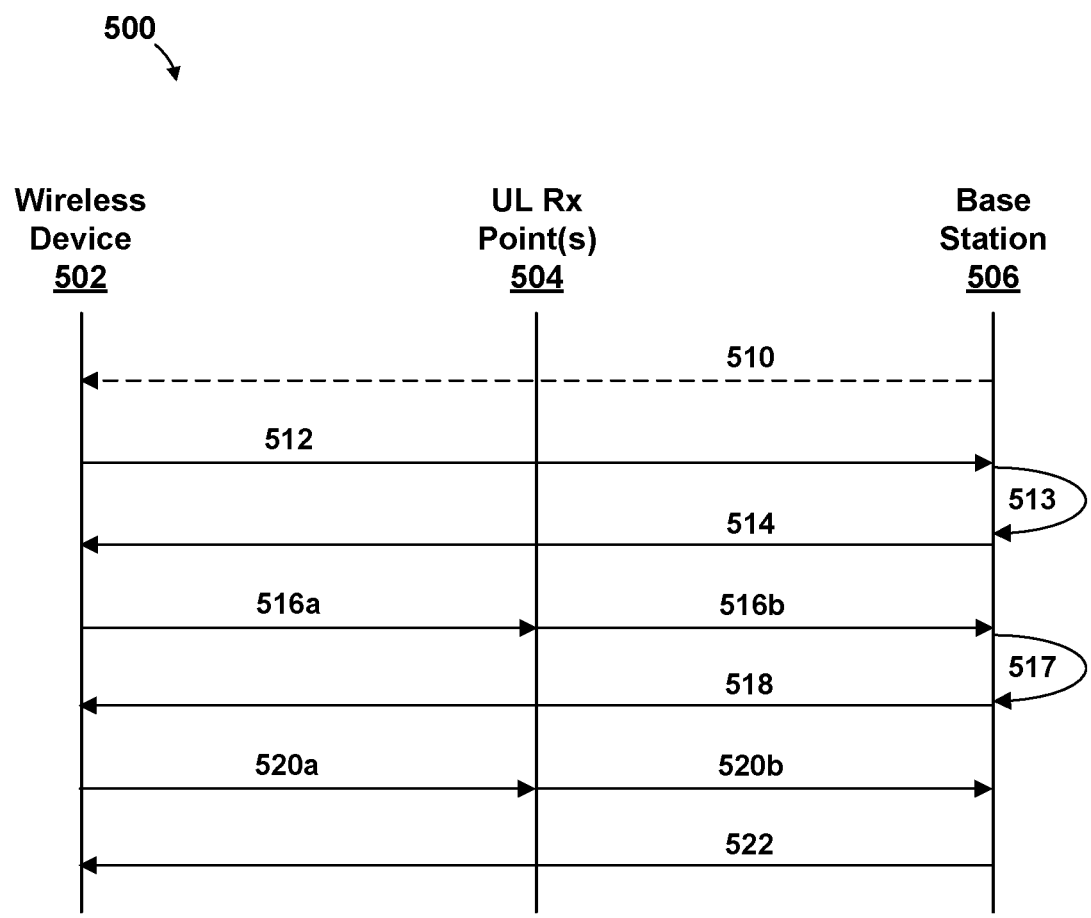
FIG. 5 is a signal flow diagram illustrating an example method for managing uplink timing advance configuration according to various embodiments.
Figure 6:
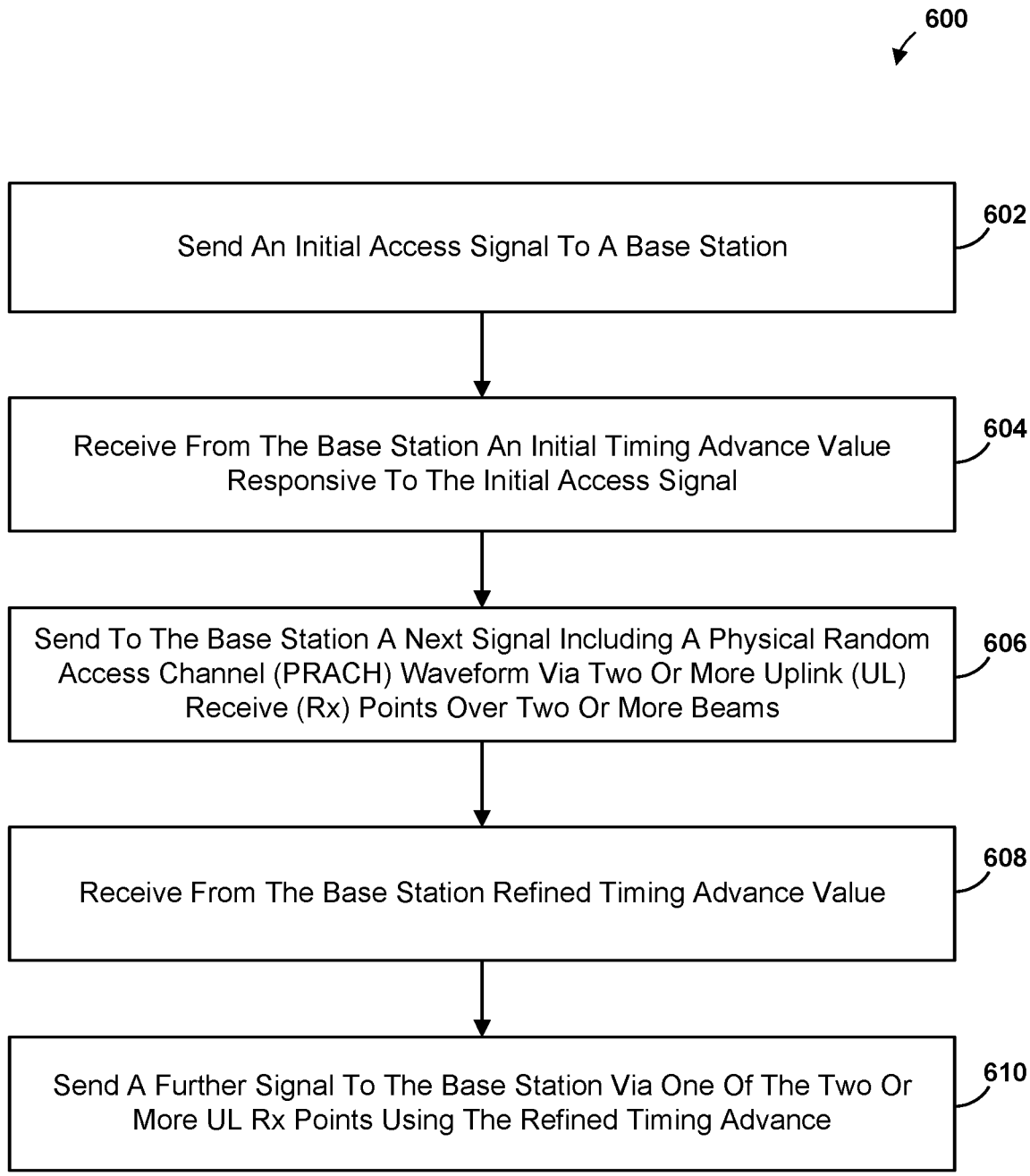
FIG. 6 is a process flow diagram illustrating an example method for managing uplink timing advance configuration according to various embodiments.
Figure 7:
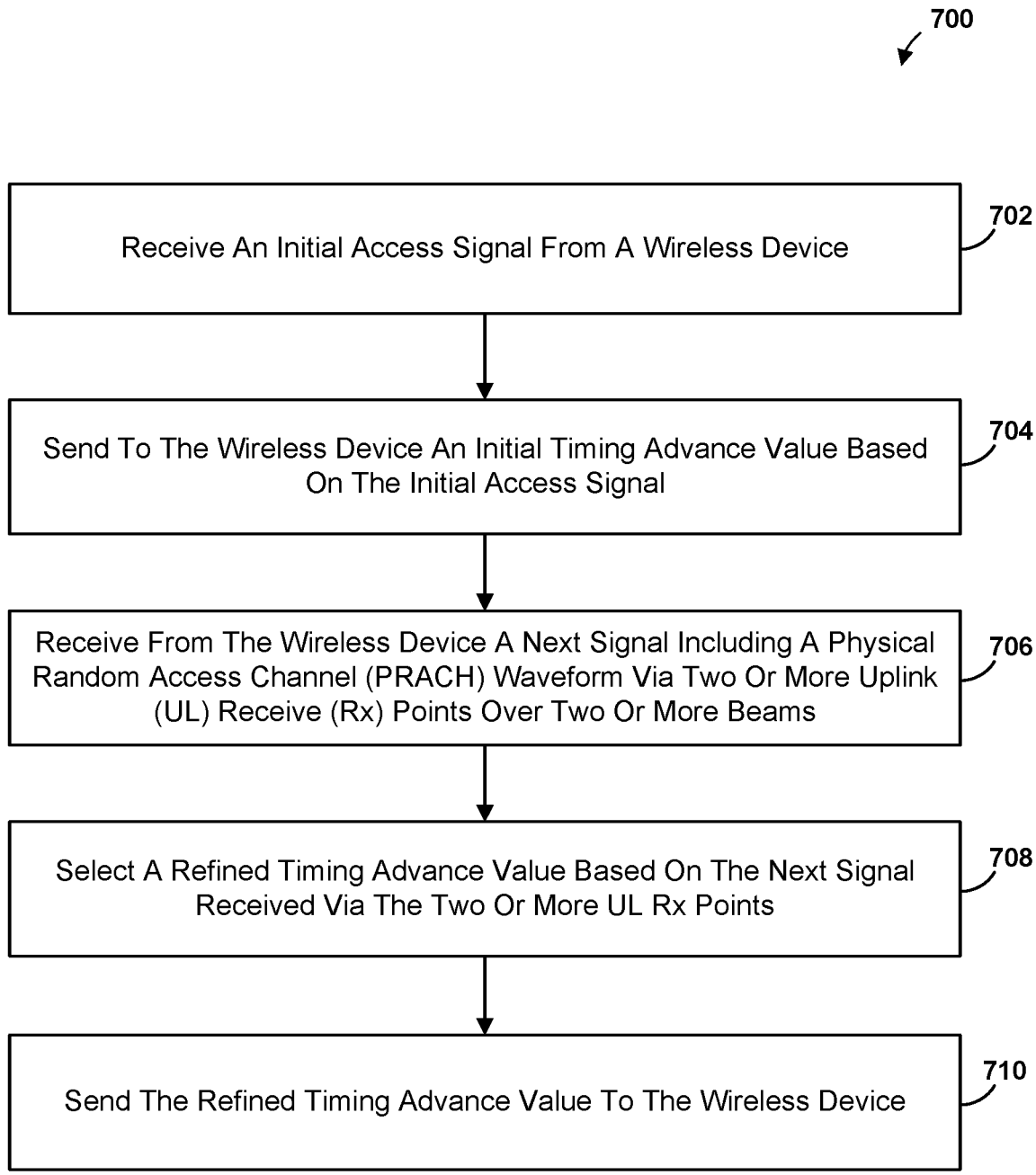
FIG. 7 is a process flow diagram illustrating an example method for managing uplink timing advance configuration according to various embodiments.

FIG. 5 is a signal flow diagram 500 illustrating an example method for managing uplink timing advance configuration. With reference to FIGS. 1-5, the illustrated operations may be implemented in a processor or processing system) (such as 210, 212, 214, 216, 218, 252, 260, 424) of a wireless device 502 (such as the wireless device 120a-120e, 200, 320, 402), a UL Rx point 504 (e.g., 110b, 110c), and a base station 506 (e.g., 110a). The signal flow diagram 500 illustrates a generalized signal flow of a 6-step RACH process, details of which are further described below (FIGS. 6 and 7).

A 6-step RACH procedure may include messages that enable a base station to determine an appropriate timing advance for a wireless device to use for uplink transmissions. In various implementations, the base station 506 may transmit (e.g., broadcast) a signal 510. Using information in the signal 510, the wireless device 502 may send a signal 512 that is received by the base station 506. In some implementations, the signal 512 may include an initial access signal, such as a first RACH signal, to initiate the RACH procedure. This signal may be referred to as a Msg1 signal.

In some implementations, the base station may select and/or determine 513 the initial timing advance value for use by the wireless device. In some implementations, the base station may send to the wireless device a signal 514 that includes the initial timing advance value based on the initial access signal. This signal may be referred to as a Msg2a. In some embodiments, the signal 514 may include a dedicated RACH occasion, a PRACH format, and a PRACH sequence for the wireless device to use in transmitting a next signal. In some embodiments, the signal 514 may include an indication of a number of repetitions for the next signal from the wireless device. In some embodiments, the signal 514 may include an indication of a number of beam sweeps for the next signal from the wireless device. In some embodiments, the signal 514 may include an indication of a plurality of PRACH formats for the next signal from the wireless device. In some embodiments, the signal 514 may include an indication of uplink resources (which may include uplink reference signal resources) for the wireless device to use in sending the next signal.

Using the indicated uplink resources, the wireless device may send a next signal 516a using a PRACH waveform via two or more UL Rx points 504 over two or more beams. This signal may be referred to as a Msg3a. The two or more UL Rx points 504 may pass on a signal 516b to the base station 506. In some embodiments, the wireless device may send the signal 516a using two or more spatial filters. In some embodiments, the wireless device may perform beam sweeping when sending the signal 516a. In some embodiments, the wireless device may send the signal 516a using a number of repetitions of the PRACH waveform on each beam. In some embodiments, the wireless device may send the signal 516a using the indicated number of beam sweeps. In some embodiments, the wireless device may send the signal 516a using the indicated plurality of PRACH formats.

The base station 506 may use the signal 516a, 516b received via the two or more UL Rx points 504 to select 517 a refined timing advance value. The base station 506 may send the refined timing value to the wireless device 502 in this signal 518. This signal may be referred to as a Msg2b signal. In various embodiments, the base station 506 may send the refined timing advance value in one or more of a PDCCH signal and a PDSCH signal. In some embodiments, the PDSCH signal may include the refined timing advance value in a payload. In such embodiments, the PDCCH signal may include uplink grant parameters for a further signal to be transmitted by the wireless device. In some embodiments, the base station may send to the wireless device a PDCCH signal, such as a DCI, that includes uplink grant parameters for the wireless device and the refined timing advance value. In some embodiments, the base station may send a timing advance command in a MAC CE. In some embodiments, the base station may send a timing advance command in signal bits used for a New Data Indicator (NDI) and/or HARQ signal.

The wireless device 502 may send a signal 520a that is received by a UL Rx point 504. The wireless device 502 may send the signal 520a using the refined timing advance corresponding to a specific UL Rx point from among the two or more UL Rx points. The UL Rx point 504 may send a signal 520b to the base station 506. In some embodiments, the signal 520a may be referred to as a Msg3 signal.

In some embodiments, the base station 506 may send a signal 522 to the wireless device 502. For example, the base station 506 may send contention resolution information to the wireless device 502 in the event that contention resolution is needed (e.g., in the event that multiple wireless devices use an identical RACH preamble to request access the network). In some embodiments, the signal 522 may be referred to a Msg4 signal.

FIG. 6 is a process flow diagram illustrating an example method 600 that may be performed by a wireless device in communication with a base station for managing uplink timing advance configuration. With reference to FIGS. 1-6, the operations of the method 600 may be implemented by a processor (such as 210, 212, 214, 216, 218, 252, 260, 424) and a wireless transceiver 266 of a wireless device (such as the wireless device 120a-120e, 200, 320, 402).

In block 602, the processor may send an initial access signal to a base station (e.g., 110a, 350, 405, 506). In some embodiments, the initial access signal may include a signal that is part of an initial access process or procedure, such as a RACH procedure. In some embodiments, the initial access signal may include a Msg1 signal of a 6-step RACH procedure. Means for performing the operations of block 602 may include the processors 212, 214, 216, 218, 252, 260, 424, and the wireless transceiver 266.

In block 604, the processor may receive from the base station an initial timing advance value responsive to the initial access signal. In some embodiments, the processor may receive from the base station a dedicated RACH occasion, a PRACH format, and a PRACH sequence for the next signal. In some embodiments, the processor may receive from the base station a number of repetitions for a next signal to be transmitted by the wireless device. In some embodiments, the processor may receive from the base station a number of beam sweeps for the next signal. In some embodiments, the processor may receive from the base station a plurality of PRACH formats for the next signal. Means for performing the operations of block 604 may include the processors 212, 214, 216, 218, 252, 260, 424, and the wireless transceiver 266.

In block 606, the processor may send to the base station a next signal that includes a PRACH waveform via two or more UL Rx points over two or more beams. In some embodiments, the wireless device may send the next signal using the PRACH waveform indicated by the base station. In some embodiments, the wireless device may send the next signal using the PRACH waveform instead of or in place of a demodulation reference signal (DM RS). In some embodiments, the wireless device may send the next signal using the dedicated RACH occasion, PRACH format(s), and PRACH sequence(s) indicated by the base station. In this manner, the wireless device may send the next signal using the indicated PRACH waveform with repetition and beam sweeping. In some embodiments, the wireless device may send the next signal using the number of repetitions indicated by the base station. In some embodiments, the wireless device may send the next signal using the number of beam sweeps indicated by the base station. In some embodiments, the wireless device may send the next signal using the plurality of PRACH formats indicated by the base station. Means for performing the operations of block 606 may include the processors 212, 214, 216, 218, 252, 260, 424, and the wireless transceiver 266.

In block 608, the processor may receive from the base station a refined timing advance value. In some embodiments, the processor also may receive information indicating uplink grant parameters for the wireless device to use in sending a further signal. In some embodiments, the refined timing advance value may correspond to a UL Rx point from among the two or more UL Rx points. Means for performing the operations of block 608 may include the processors 212, 214, 216, 218, 252, 260, 424, and the wireless transceiver 266.

In block 610, the processor may send a further signal to the base station via one of the two or more UL Rx points using the refined timing advance. In some embodiments, the refined timing advance value may correspond to the one of the two or more UL Rx points. Means for performing the operations of block 610 may include the processors 212, 214, 216, 218, 252, 260, 424, and the wireless transceiver 266.

FIG. 7 is a process flow diagram illustrating an example method 700 that may be performed by a base station in communication with a wireless device for managing uplink spatial filter configuration. With reference to FIGS. 1-7, the operations of the method 700 may be implemented by a processing system (such as 210, 212, 214, 216, 218, 252, 260, 428) (a "processor") of a base station (such as the base station 110a, 350, 405, 506).

In block 702, the processor may receive an initial access signal from a wireless device. In some embodiments, the initial access signal may include a signal that is part of an initial access process or procedure, such as a RACH procedure. In some embodiments, the initial access signal may include a Msg1 signal of a 6-step RACH procedure. Means for performing the operations of block 702 may include a processor (e.g., 212, 214, 216, 218, 252, 260, 428) and a wireless transceiver 266 of a base station 405.

In block 704, the processor may send to the wireless device an initial timing advance value based on the initial access signal. In some embodiments, the processor may send a dedicated RACH occasion, a PRACH format, and a PRACH sequence for the wireless device to use and transmitting a next signal.

In some embodiments, the base station may send to the wireless device a PDCCH signal and a PDSCH signal. In such embodiments, the PDSCH signal may include the refined timing advance value in a payload. In such embodiments, the PDCCH signal may include uplink grant parameters for a further signal to be transmitted by the wireless device. In some embodiments, the base station may send to the wireless device a PDCCH signal, such as DCI, that includes uplink grant parameters for the wireless device and the refined timing advance value. In some embodiments, the base station may send a timing advance command in a MAC CE. In some embodiments, the base station may send a timing advance command in signal bits used for an NDI and/or HARQ signal. Means for performing the operations of block 704 may include the processors 212, 214, 216, 218, 252, 260, 428, and the wireless transceiver 266.

In block 706, the processor may receive from the wireless device a next signal that includes a PRACH waveform via two or more UL Rx points over two or more beams. In some embodiments, the PRACH waveform received via the two or more UL Rx points may enable the processor to determine a refined timing advance value for use by the wireless device. Means for performing the operations of block 706 may include the processors 212, 214, 216, 218, 252, 260, 428, and the wireless transceiver 266.

In block 708, the processor may selecting a refined timing advance value based on the next signal received via the two or more UL Rx points. In some embodiments, the refined timing advance value may correspond to a specific UL Rx point from among the two or more UL Rx points. Means for performing the operations of block 708 may include the processors 212, 214, 216, 218, 252, 260, 428.

In block 710, the processor may send the refined timing advance value to the wireless device. In some embodiments, the processor may send the refined timing advance value in to the wireless device one or more of a PDCCH signal and a PDSCH signal. In such embodiments, the PDSCH signal may include the refined timing advance value in a payload. In such embodiments, the PDCCH signal may include uplink grant parameters for a further signal to be transmitted by the wireless device. In some embodiments, the base station may send to the wireless device a PDCCH signal, such as DCI, that includes uplink grant parameters for the wireless device and the refined timing advance value.

In some embodiments, the base station may send information indicating uplink grant parameters for the wireless device to use in sending a further signal. In some embodiments, the base station may address the refined timing advance value specifically to the wireless device, for example, using a TC-RNTI. In some embodiments, the refined timing advance value may correspond to a UL Rx point from among the two or more UL Rx points. In this manner, the refined timing advance value may enable the alignment of the timing of downlink signals from the base station to the wireless device and uplink signals from the wireless device that are received by the UL Rx point. Means for performing the operations of block 710 may include the processors 212, 214, 216, 218, 252, 260, 428, and the wireless transceiver 266.

Figure 8:
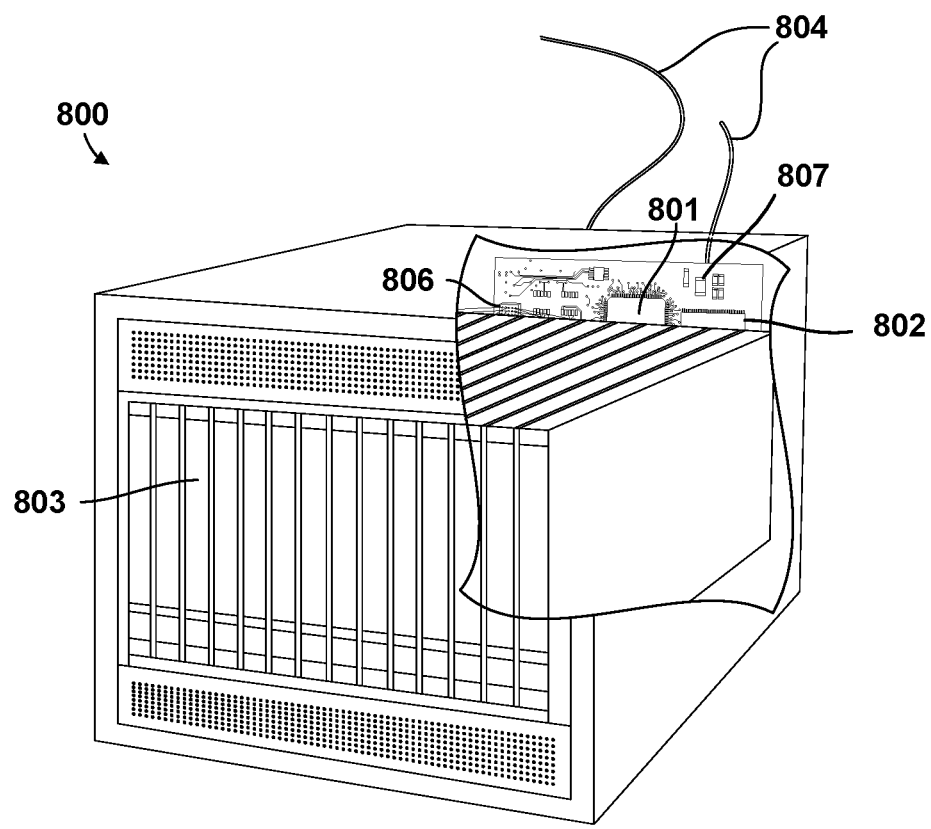
FIG. 8 is a component block diagram illustrating an example network computing device.

FIG. 8 is a component block diagram illustrating an example of a network computing device 800. With reference to FIGS. 1-8, the network computing device 800 may function as a network element of a communication network, such as a base station (for example, the base station 110a, 110b, 350). The network computing device 800 may include an apparatus (such as a processing system) 801 coupled to volatile memory 802 and a large capacity nonvolatile memory, such as a disk drive 803. The network computing device 800 also may include a peripheral memory access device such as a floppy disc drive, compact disc (CD) or digital video disc (DVD) drive 806 coupled to the apparatus 801. The network computing device 800 also may include network access ports 804 (or interfaces) coupled to the apparatus 801 for establishing data connections with a network, such as the Internet or a local area network coupled to other system computers and servers. The network computing device 800 may include one or more antennas 807 for sending and receiving electromagnetic radiation that may be connected to a wireless communication link. The network computing device 800 may include additional access ports, such as USB, Firewire, Thunderbolt, and the like for coupling to peripherals, external memory, or other devices.

Figure 9:
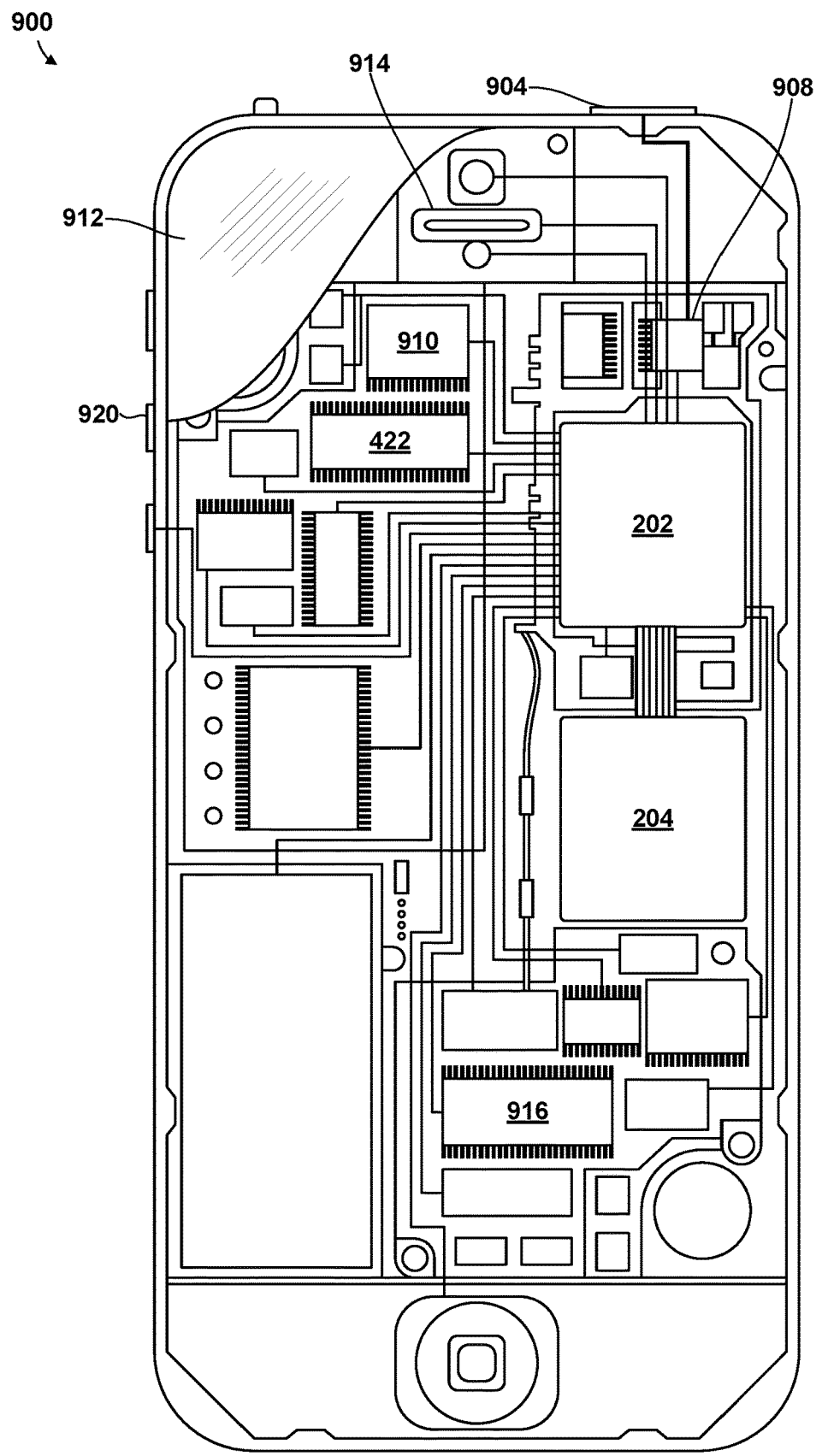
FIG. 9 is a component block diagram illustrating an example wireless device.

FIG. 9 is a component block diagram illustrating an example wireless device 900. With reference to FIGS. 1-9, the wireless device 900 (such as the wireless device 120a-120e, 200, 320, 404) may be a device suitable for use in various implementations, such as a mobile device. The wireless device 900 may include a first SOC 202 (such as a SOC-CPU) coupled to a second SOC 204 (such as a 5G capable SOC). The first and second SOCs 202, 204 may be coupled to internal memory 422, 916, a display 912, and to a speaker 914. Additionally, the wireless device 900 may include an antenna 904 for sending and receiving electromagnetic radiation that may be connected to a wireless data link or cellular telephone transceiver 908 coupled to one or more processing systems in the first or second SOCs 202, 204. The wireless device 900 may include menu selection buttons or rocker switches 920 for receiving user inputs.

The wireless device 900 also may include a sound encoding/decoding (CODEC) circuit 910, which digitizes sound received from a microphone into data packets suitable for wireless transmission and decodes received sound data packets to generate analog signals that are provided to the speaker 914 to generate sound. One or more of the processing systems in the first and second SOCs 202, 204, wireless transceiver 908 and CODEC 910 may include a digital signal processor (DSP) circuit (not shown separately).

The processing systems of the network computing device 800 and the wireless device 900 may be any programmable microprocessor, microcomputer or multiple processor chip or chips that can be configured by processor-executable instructions to perform a variety of functions, including the functions of the various implementations described herein. In some mobile devices, multiple processing systems may be provided, such as one processing system within an SOC 204 dedicated to wireless communication functions and one processing system within an SOC 202 dedicated to running other applications. Software applications may be stored in the memory 422, 426, 802, 916 before they are accessed and loaded into the processing system. The processing systems may include internal memory sufficient to store the application software instructions.

Implementation examples are described in the following paragraphs. While some of the following implementation examples are described in terms of example methods, further example implementations may include: the example methods discussed in the following paragraphs implemented by a wireless device or base station including an apparatus with a processing system configured with processor-executable instructions to perform operations of the methods of the following implementation examples; the example methods discussed in the following paragraphs implemented by a wireless device or base station including means for performing functions of the methods of the following implementation examples; and the example methods discussed in the following paragraphs may be implemented as a non-transitory processor-readable storage medium having stored thereon processor-executable instructions configured to cause a processor of a wireless device or base station to perform the operations of the methods of the following implementation examples.

Example 1. A method performed by a processor of a wireless device for managing uplink timing advance configuration, including sending an initial access signal to a base station, receiving from the base station an initial timing advance value responsive to the initial access signal, sending to the base station a next signal including a Physical Random Access Channel (PRACH) waveform via two or more uplink (UL) receive (Rx) points over two or more beams, receiving from the base station a refined timing advance value, and sending a further signal to the base station via one of the two or more UL Rx points using the refined timing advance value.

Example 2. The method of example 1, in which receiving from the base station an initial timing advance value responsive to the initial access signal includes receiving from the base station a dedicated Random Access Channel (RACH) occasion, a PRACH format, and a PRACH sequence for the next signal, and sending to the base station the next signal includes sending the next signal using the dedicated RACH occasion, PRACH format, and PRACH sequence.

Example 3. The method of either of examples 1 or 2, in which receiving from the base station an initial timing advance value responsive to the initial access signal includes receiving from the base station a number of repetitions for the next signal, and sending to the base station the next signal may include sending the next signal using the number of repetitions.

Example 4. The method of any of examples 1-3, in which receiving from the base station an initial timing advance value responsive to the initial access signal includes receiving from the base station a number of beam sweeps for the next signal, and sending to the base station the next signal may include sending the next signal using the number of beam sweeps.

Example 5. The method of any of examples 1-4, in which receiving from the base station an initial timing advance value responsive to the initial access signal includes receiving from the base station a plurality of PRACH formats for the next signal, and sending to the base station the next signal may include sending the plurality of PRACH formats.

Example 6. The method of any of examples 1-5, in which the refined timing advance value corresponds to one of the two or more UL Rx points.

Example 7. A method performed by a processor of a base station for managing uplink timing advance configuration, including receiving an initial access signal from a wireless device, sending to the wireless device an initial timing advance value based on the initial access signal, receiving from the wireless device a next signal including a Physical Random Access Channel (PRACH) waveform via two or more uplink (UL) receive (Rx) points over two or more beams, selecting a refined timing advance value based on the next signal received via the two or more UL Rx points, and sending the refined timing advance value to the wireless device.

Example 8. The method of example 7, in which sending to the wireless device an initial timing advance value based on the initial access signal includes sending to the wireless device a dedicated Random Access Channel (RACH) occasion, a PRACH format, and a PRACH sequence for the next signal from the wireless device.

Example 9. The method of either of examples 7 or 8, in which sending to the wireless device an initial timing advance value based on the initial access signal includes sending to the wireless device a number of repetitions for the next signal from the wireless device.

Example 10. The method of any of examples 7-9, in which sending to the wireless device an initial timing advance value based on the initial access signal includes sending to the wireless device a number of beam sweeps for the next signal from the wireless device.

Example 11. The method of any of examples 7-10, in which sending to the wireless device an initial timing advance value based on the initial access signal includes sending to the wireless device a plurality of PRACH formats for the next signal from the wireless device.

Example 12. The method of any of examples 7-11, in which the refined timing advance value corresponds to a UL Rx point from among the two or more UL Rx points.

Example 13. The method of any of examples 7-12, in which sending the refined timing advance value to the wireless device includes sending to the wireless device one or more of a Physical Downlink Control Channel (PDCCH) signal and a Physical Downlink Shared Channel (PDSCH) signal.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various implementations. Such services and standards include, such as third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (such as cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, or content messages. It should be understood that any references to terminology or technical details related to an individual telecommunication standard or technology are for illustrative purposes only, and are not intended to limit the scope of the claims to a particular communication system or technology unless specifically recited in the claim language.

Various implementations illustrated and described are provided merely as examples to illustrate various features of the claims. However, features shown and described with respect to any given implementation are not necessarily limited to the associated implementation and may be used or combined with other implementations that are shown and described. Further, the claims are not intended to be limited by any one example implementation. For example, one or more of the operations of the methods and operations 500, 600, and 700 may be substituted for or combined with one or more operations of the methods and operations 500, 600, and 700. The foregoing method descriptions and the process flow diagrams are provided merely as illustrative examples and are not intended to require or imply that the operations of various embodiments must be performed in the order presented. As will be appreciated by one of skill in the art the operations in the foregoing embodiments may be performed in any order.

Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus. If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a wireless device for managing uplink timing advance configuration, comprising:
    sending an initial access signal to a base station;
    receiving from the base station an initial timing advance value responsive to the initial access signal;
    sending to the base station a next signal comprising a Physical Random Access Channel (PRACH) waveform via two or more uplink (UL) receive (Rx) points over two or more beams;
    receiving from the base station a refined timing advance value corresponding to one of the two or more UL Rx points; and
    sending a further signal to the base station via one of the two or more UL Rx points using the refined timing advance value.

2. The method of claim 1, wherein:
    receiving from the base station an initial timing advance value responsive to the initial access signal comprises receiving from the base station a dedicated Random Access Channel (RACH) occasion, a PRACH format, and a PRACH sequence for the next signal; and
    sending to the base station the next signal comprises sending the next signal using the dedicated RACH occasion, PRACH format, and PRACH sequence.

3. The method of claim 1, wherein:
    receiving from the base station an initial timing advance value responsive to the initial access signal comprises receiving from the base station a number of repetitions for the next signal; and
    sending to the base station the next signal comprises sending the next signal using the number of repetitions.

4. The method of claim 1, wherein:
    receiving from the base station an initial timing advance value responsive to the initial access signal comprises receiving from the base station a number of beam sweeps for the next signal; and
    sending to the base station the next signal comprises sending the next signal using the number of beam sweeps.

5. The method of claim 1, wherein:
    receiving from the base station an initial timing advance value responsive to the initial access signal comprises receiving from the base station a plurality of PRACH formats for the next signal; and sending to the base station the next signal comprises sending the plurality of PRACH formats.

6. A method performed by a processor of a base station for managing uplink timing advance configuration, comprising:
receiving an initial access signal from a wireless device;
sending to the wireless device an initial timing advance value based on the initial access signal;
receiving from the wireless device a next signal comprising a Physical Random Access Channel (PRACH) waveform via two or more uplink (UL) receive (Rx) points over two or more beams;
selecting a refined timing advance value based on the next signal received via the two or more UL Rx points, wherein the refined timing advance value corresponds to a UL Rx point from among the two or more UL Rx points; and
sending the refined timing advance value to the wireless device.

7. The method of claim 6, wherein sending to the wireless device an initial timing advance value based on the initial access signal comprises sending to the wireless device a dedicated Random Access Channel (RACH) occasion, a PRACH format, and a PRACH sequence for the next signal from the wireless device.

8. The method of claim 6, wherein sending to the wireless device an initial timing advance value based on the initial access signal comprises sending to the wireless device a number of repetitions for the next signal from the wireless device.

9. The method of claim 6, wherein sending to the wireless device an initial timing advance value based on the initial access signal comprises sending to the wireless device a number of beam sweeps for the next signal from the wireless device.

10. The method of claim 6, wherein sending to the wireless device an initial timing advance value based on the initial access signal comprises sending to the wireless device a plurality of PRACH formats for the next signal from the wireless device.

11. The method of claim 6, wherein sending the refined timing advance value to the wireless device comprises sending to the wireless device one or more of a Physical Downlink Control Channel (PDCCH) signal and a Physical Downlink Shared Channel (PDSCH) signal.

12. A wireless device, comprising:
a processor configured with processor executable instructions to:
send an initial access signal to a base station;
receive from the base station an initial timing advance value responsive to the initial access signal;
send to the base station a next signal comprising a Physical Random Access Channel (PRACH) waveform via two or more uplink (UL) receive (Rx) points over two or more beams;
receive from the base station a refined timing advance value corresponding to one of the two or more UL Rx points; and
send a further signal to the base station via one of the two or more UL Rx points using the refined timing advance value.

13. The wireless device of claim 12, wherein the processor is configured with processor executable instructions to:
receive from the base station a dedicated Random Access Channel (RACH) occasion, a PRACH format, and a PRACH sequence for the next signal; and
send the next signal using the dedicated RACH occasion, PRACH format, and PRACH sequence.

14. The wireless device of claim 12, wherein the processor is configured with processor executable instructions to:
receive from the base station a number of repetitions for the next signal; and
send the next signal using the number of repetitions.

15. The wireless device of claim 12, wherein the processor is configured with processor executable instructions to:
receive from the base station a number of beam sweeps for the next signal; and
send the next signal using the number of beam sweeps.

16. The wireless device of claim 12, wherein the processor is configured with processor executable instructions to:
receive from the base station a plurality of PRACH formats for the next signal; and
send the plurality of PRACH formats.

17. A base station, comprising:
a processor configured with processor executable instructions to:
receive an initial access signal from a wireless device;
send to the wireless device an initial timing advance value based on the initial access signal;
receive from the wireless device a next signal comprising a Physical Random Access Channel (PRACH) waveform via two or more uplink (UL) receive (Rx) points over two or more beams;
select a refined timing advance value based on the next signal received via the two or more UL Rx points, wherein the refined timing advance value corresponds to a UL Rx point from among the two or more UL Rx points; and
send the refined timing advance value to the wireless device.

18. The base station of claim 17, wherein the processor is configured with processor executable instructions to send to the wireless device a dedicated Random Access Channel (RACH) occasion, a PRACH format, and a PRACH sequence for the next signal from the wireless device.

19. The base station of claim 17, wherein the processor is configured with processor executable instructions to send to the wireless device a number of repetitions for the next signal from the wireless device.

20. The base station of claim 17, wherein the processor is configured with processor executable instructions to send to the wireless device a number of beam sweeps for the next signal from the wireless device.

21. The base station of claim 17, wherein the processor is configured with processor executable instructions to send to the wireless device a plurality of PRACH formats for the next signal from the wireless device.

22. The base station of claim 17, wherein the processor is configured with processor executable instructions to send to the wireless device one or more of a Physical Downlink Control Channel (PDCCH) signal and a Physical Downlink Shared Channel (PDSCH) signal.

* * * * *